United States Patent
Melgaard et al.

(10) Patent No.: US 7,180,931 B1
(45) Date of Patent: Feb. 20, 2007

(54) ELECTRODE IMMERSION DEPTH DETERMINATION AND CONTROL IN ELECTROSLAG REMELTING FURNACE

(75) Inventors: David K. Melgaard, Albuquerque, NM (US); Joseph J. Beaman, Austin, TX (US); Gregory J. Shelmidine, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/853,477

(22) Filed: May 25, 2004

(51) Int. Cl.
*H05B 3/60* (2006.01)
(52) U.S. Cl. .................. 373/49; 373/50; 373/105
(58) Field of Classification Search ............... 373/42, 373/47, 49, 50, 67, 70, 102–105
See application file for complete search history.

(56) References Cited

U.S. PATENT DOCUMENTS

| | | | |
|---|---|---|---|
| 4,000,361 A | * | 12/1976 | Bondarenko et al. ......... 373/50 |
| 4,194,078 A | | 3/1980 | Thomas |
| 4,303,797 A | | 12/1981 | Roberts |
| 4,476,565 A | | 10/1984 | Rashev et al. |
| 4,483,708 A | | 11/1984 | Gfrerer et al. |
| 4,669,087 A | | 5/1987 | Rasheva et al. |
| 5,331,661 A | | 7/1994 | Maguire et al. |
| 5,568,506 A | | 10/1996 | Schlienger |
| 5,737,355 A | | 4/1998 | Damkroger |
| 6,115,404 A | * | 9/2000 | Bertram et al. ............. 373/102 |

* cited by examiner

*Primary Examiner*—Tu Hoang
(74) *Attorney, Agent, or Firm*—Elmer A. Klavetter

(57) ABSTRACT

An apparatus and method for controlling an electroslag remelting furnace comprising adjusting electrode drive speed by an amount proportional to a difference between a metric of electrode immersion and a set point, monitoring impedance or voltage, and calculating the metric of electrode immersion depth based upon a predetermined characterization of electrode immersion depth as a function of impedance or voltage.

16 Claims, 3 Drawing Sheets

US 7,180,931 B1

ELECTRODE IMMERSION DEPTH DETERMINATION AND CONTROL IN ELECTROSLAG REMELTING FURNACE

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field):

The present invention relates to electroslag remelting ("ESR") electrode immersion depth control systems and methods.

2. Description of Related Art

As shown in FIG. 1, ESR furnaces 10 have been utilized for over 40 years to refine metals and produce fully dense homogeneous ingots 22. The remelting takes place by immersing a consumable metal electrode 14 into a molten slag bath 18 that is resistively heated to a temperature above the melting point of the metal. The electrode gradually melts, forming metal droplets that fall through the slag and collect in a pool 20 under the slag. The molten pool is contained within a water-cooled mold 16 that has a slightly larger size than the electrode. As the electrode melts, it must be translated downward by an electrode drive 12 at a rate related to the fill ratio and the melt rate, as specified by the system controller 24. A complicating factor is that a small amount of slag solidifies on the surface of the mold, changing the amount of metal needed to fill the mold, and changing the thickness of the molten slag on top of the ingot.

To produce a high quality homogeneous ingot with good surface quality, the deviations in the process—specifically immersion depth—need to be minimized. To optimize process efficiency and surface quality, the immersion depth must be maintained at a constant, shallow level. Shallower immersion depths have been shown to result in improved surface quality, hence improved process yields. However, the shallower the immersion depth, the more sensitive the process is to input or external variables, hence, the more difficult it is to control. If the immersion depth is allowed to get too shallow, gaps can form between portions of the electrode surface and the slag, leading to arcing, atmospheric exposure, and deleterious oxidizing reactions. Conversely, too large an immersion depth, or too much variability in depth, can lead to poor surface and metallurgical quality in the ingot.

Again, the ESR process is used to refine metal, remove inclusions, and produce ingots having a uniform solidification grain structure and good surface quality. The immersion depth is an important parameter to control since it has a major effect on the thermal conditions governing melting and solidification. Deviations in immersion depth will alter the thermal environment of the process, inducing changes in the melting process (rate, efficiency, configuration, droplet location and size) and on solidification parameters (rate, direction, molten metal flow). As a result, immersion depth fluctuations will result in changes to the ingot's solidified grain structure, compositional homogeneity, and properties, and affect subsequent processing operations and final product quality.

No system or method currently exists to measure the depth directly so it must be inferred from electrical signals in the process. At present, the ESR immersion depth is controlled in most systems by using the voltage and voltage swing, which is a measure of the variation in the voltage. These methods will be referred to as swing controllers.

The voltage is used because usually it rises as the immersion depth decreases. At a simplified level, the slag can be viewed as a resistor, so the voltage is given by Ohm's Law:

$$V = I[d/(Ak)],$$

where V is the voltage, I is the current, and the resistance of the slag is approximated by the expression in the brackets where d is the distance between the electrode and the molten metal pool, A is the area of the electrode in contact with the slag, and k is the slag conductivity. However, there are numerous simplifications inherent in this treatment, so voltage is only a rough indicator of electrode position. Additionally, the slag thermal environment and chemistry will change over the course of a melt, hence its conductivity is not constant. The amount of molten slag will change during a melt as well, due to slag plating out on the cold crucible walls, further altering the above relationship.

Consequently, while voltage is an effective immediate indicator of relative electrode position in the slag, voltage alone is not adequate to indicate or maintain a constant immersion depth over time, so current controllers use voltage swing as well. Unlike voltage, voltage swing cannot be directly related to the overall system response via an equation such as the one presented above, nor can it be used as an instantaneous indicator of the depth. However, regardless of slag amount, conditions, or properties, the isopotential lines within the molten slag are compressed near the surface of the slag. Consequently, it is believed that voltage variation or swing is less sensitive than voltage to the factors that can change during the course of a melt or between melts or furnaces. As a result, changes in voltage swing can be more reliably, but not quantitatively, related to a changes in immersion depth over the long term.

Existing control methods drive the electrode in response to the error between the system voltage and a voltage set point, with the voltage set point periodically adjusted to match a swing set point. The controllers utilize bi-directional electrode drive to oscillate around the set point, inherently resulting in constant fluctuation of the immersion depth. Because the electrode is moved up as well as down in the slag, existing control systems require a deeper immersion depth for stable operation. By operating at a greater depth as well as introducing increased variation in the depth, surface quality can suffer. A more recently developed ESR control system employs as the electrode drive the combination of a set unidirectional motion and a superimposed periodic fluctuation. This system then superimposes a periodic fluctuation of known amplitude (rather than electrode motion in response to a voltage error) to provide electrode motion relative to the isopotential lines in the slag, and thus generate the voltage swing signal. This system was described in U.S. Pat. No. 5,737,355, to Damkroger, titled "Directly Induced Swing for Closed Loop Control of Electroslag Remelting Furnace". The drive is described by the equation:

$$\text{Drive Speed} = D_{ave} + D_i(t),$$

where $D_{ave}$ is the average unidirectional drive speed and $D_i(t)$ is the periodic fluctuation. In the long term, positive deviations of voltage swing from the set point are believed to indicate too shallow immersion, and used to increase the basic unidirectional drive speed. Negative deviations are used to do the opposite.

The directly induced swing system eliminated the confounding effect of the system's own drive response on voltage swing. However, it incorporates no short-term response to an error, which limits its ability to operate very near the slag surface. Later modifications of the directly induced swing sought to address this shortcoming by incorporating a (usually limited) voltage error response as was used in the original swing controllers, resulting in a strategy described by the following equation:

$$\text{Drive Speed} = D_{avg} + D_i(t) + K_e(V_{rms} - V_{sp}),$$

combining an average speed, $D_{avg}$, an imposed pattern, $D_i(t)$ and a speed proportional, $K_e$, to the voltage error, i.e., the difference between the measured voltage, $V_{rms}$ and the voltage set point, $V_{sp}$. The average is usually a long term average of the drive speed. Over the long term, the voltage swing is measured and deviations from its set point are used to adjust the voltage set point, usually with a linear gain factor.

Another method of controlling electrode depth is presented by U.S. Pat. No. 6,496,530, titled "Impedance Spike Control of Electrode Depth in Electroslag Remelting", to Melgaard, et al., which employs a phenomenon known as impedance spikes.

Other ESR control systems known in the art are described in the following references: U.S. Pat. Nos. 4,075,414 and 4,194,078, to Thomas, disclose methods for controlling immersion depth by measuring the slag resistance and moving the electrode and monitoring the resistance change, and by measuring the electromagnetic emission from arcing, respectively. U.S. Pat. No. 4,303,797, to Roberts, discloses determining the drive speed for immersion depth based furnace geometry, voltage, and voltage variation, current and/or current variation. U.S. Pat. No. 4,476,565, to Rashev et al., discloses maintaining depth by detecting arc discharges when the electrode is outside the range. U.S. Pat. No. 4,483,708, to Gfrerer et al., discloses maintaining depth by determining weight of immersed portion of the electrode. U.S. Pat. No. 4,669,087, to Rasheva et al., discloses controlling depth by monitoring arc discharges. U.S. Pat. No. 5,331,661, to Maguire et al., discloses monitoring power phase angle for depth control. U.S. Pat. No. 5,568,506, to Schlienger, discloses using a constant voltage power supply and constant drive speed to hold the depth.

While some of the above mentioned inventions were able to reduce the immersion depth fluctuations over the standard swing controllers, none provided any means for estimating the actual immersion depth. The present invention allows an ESR furnace to be controlled in a more stable manner, by characterizing the actual immersion depth as a function of impedance and incorporating this into the electrode positioning control strategy.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
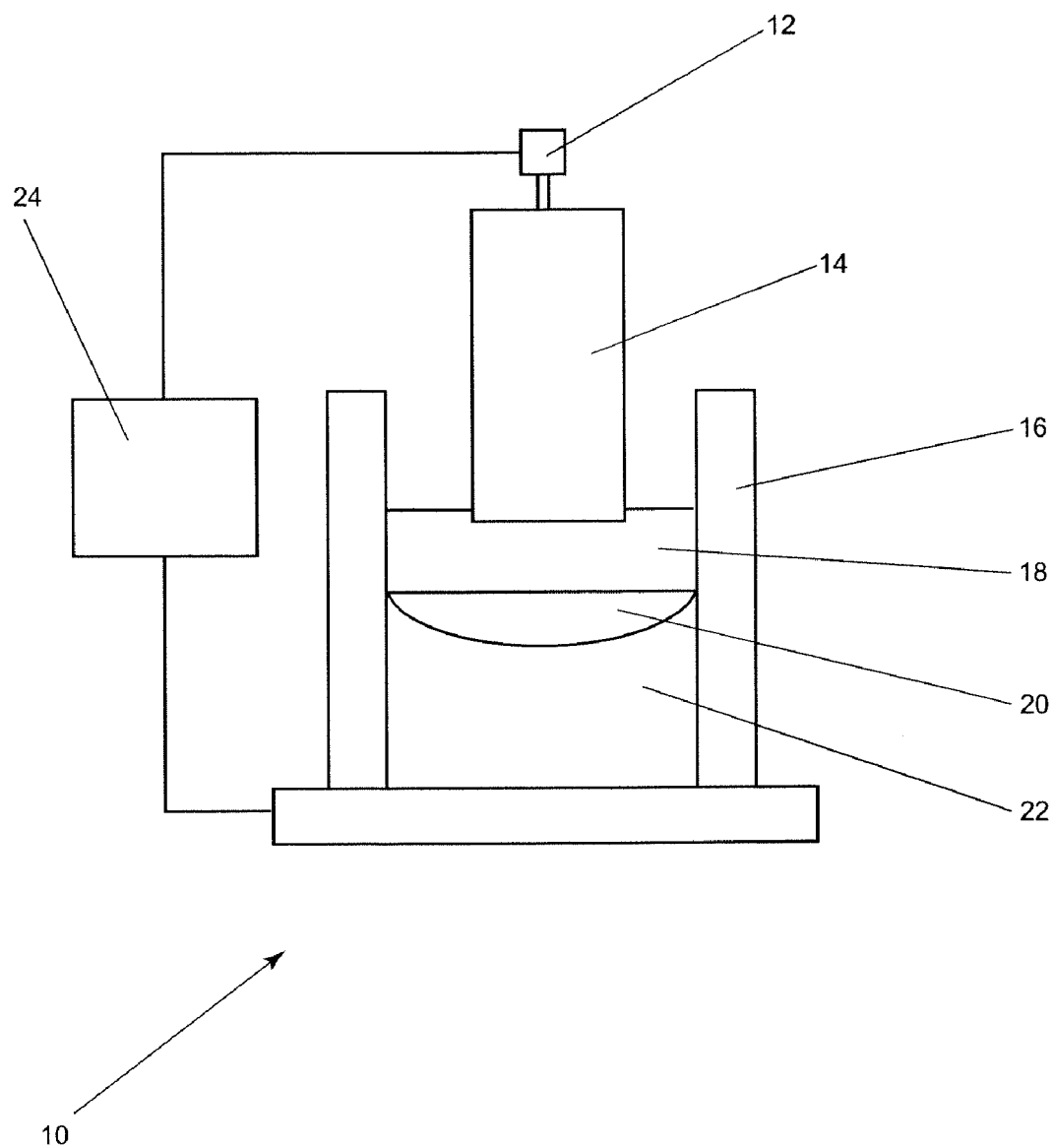
FIG. 1 is a schematic of an ESR furnace, as known in the prior art, but in which a modified control method is employed in the present invention.

The present invention is of a control method and apparatus for controlling an electroslag remelting (ESR) furnace, and specifically to improve control of the depth to which electrode is immersed in the molten slag (electrode immersion depth). The invention characterizes immersion depth as a function of impedance and incorporates this into the electrode positioning control strategy. The invention allows the electrode to be controlled at a lower immersion depth, in a more consistent and stable fashion than is achieved with existing control methods. Both of these outcomes lead to the production of a superior quality ingot, in terms of internal metallurgical structure and surface quality.

To reiterate, ESR has been utilized for over 40 years to refine metals, remove inclusions and produce fully dense homogeneous ingots. The goal of the process is to produce ingots with uniform solidification grain structure and good surface quality. The remelting takes place by immersing a consumable metal electrode into a molten slag bath that is resistively heated to a temperature above the melting point of the metal. The electrode gradually melts, forming metal droplets that fall through the slag and collect in a pool under the slag. The molten pool is contained within a water-cooled mold that has a slightly larger size than the electrode. As the electrode melts, it must be translated downward at a rate related to the fill ratio and the melt rate, to keep the electrode in the slag.

The immersion depth or the depth the electrode is immersed into the molten slag is an important parameter to control since it has a major effect on the thermal conditions governing melting and solidification. Deviations in immersion depth will alter the thermal environment of the process, inducing changes in the melting process (rate, efficiency, configuration, droplet location and size) and on solidification parameters (rate, direction, molten metal flow). As a result, immersion depth fluctuations will result in changes to the ingot's solidified grain structure, compositional homogeneity, and properties, affecting subsequent processing operations and final product quality. In addition variation in immersion depth causes temperature changes in the molten slag, causing variation in the amount of slag that solidifies on the mold surface. Ultimately that variation degrades the surface quality of the ingot. The principle problem in controlling the immersion depth in ESR is that there is no current method for measuring the depth or for determining the depth from other measurements due to the dynamic, volatile, and extreme nature of the process. A complicating factor is that as slag solidifies on the surface of the mold, it changes the amount of metal needed to fill the mold, and changes the thickness of the molten slag on top of the ingot. Also the tip of the electrode is not flat, rather variation on the order of 5 mm or more is common and that contributes to the difficulty in defining as well as determining the depth.

The primary electrode positioning method that existing control systems employ to control the immersion depth utilizes the difference between a voltage set point and the measured system voltage to generate a drive speed. If the voltage is higher than the set point, the electrode is driven down and conversely if it is lower, the electrode is driven up. Generally the magnitude of the drive signal is proportional to the error. However the immersion depth is not constant on different melts or on the same melt over time even if the voltage is constant. Consequently, the voltage set point is determined by the magnitude of the voltage variation associated with the electrode's melting and motion. A higher variation generally indicates a shallower depth. Consequently, existing system define a voltage variation set point. If the variation is too high, the voltage set point is lowered and conversely if the variation is too low, the set point is raised. In ESR furnaces, however there is no way to isolate the contributions of many factors that will affect voltage variation. In particularly, the immersion depth does not have a direct relationship to the variation. Beside the immersion depth, other factors affecting the variation include; the magnitude of the electrode motion, electrode drive speed and response characteristics, slag volume, slag motion, slag composition, electrode and slag thermal profiles, as well as other sometimes indeterminate furnace properties. As a result, existing systems make no claim to operate at a specific depth. In fact because of the factors that influence the voltage variation, they are not even able to maintain a consistent depth. Other inventions have proposed using electrical properties similar to voltage, phase angle, induced swing or impedance spikes as relative indicators of the depth, but none of these provide a method for knowing what the depth is.

This invention provides a means for determining when the tip of the electrode in an Electroslag Remelting (ESR) furnace is at the surface of the slag, and an appropriate relationship to calculate the distance the electrode tip is from the surface during the remelting process. With this information, the immersion depth can then be controlled to a specified depth by moving the electrode up or down using the ram drive system in response to the deviation from the desired depth. By providing a known depth of the electrode in the slag, the variation within a melt and between melts and furnaces can be reduced, consistently producing superior quality ingots, in terms of internal metallurgical structure and surface quality.

Figure 2:
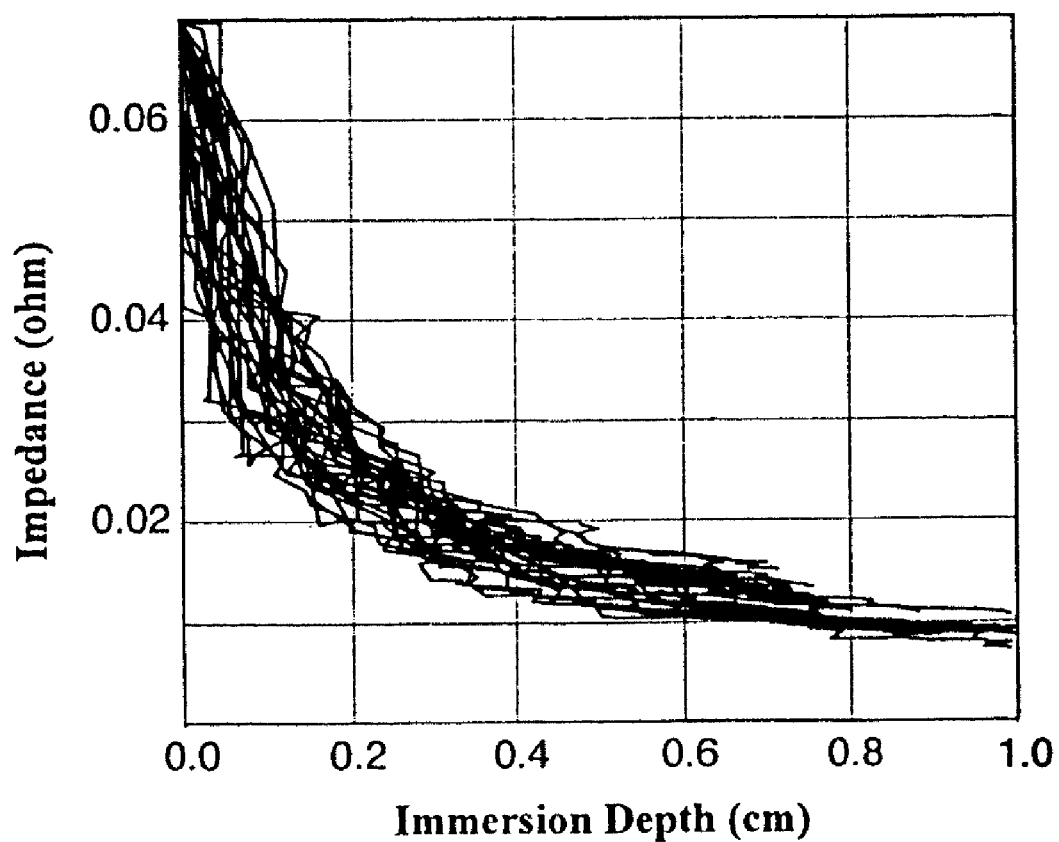
FIG. 2 is a graph showing the relationship between impedance and electrode immersion depth for a particular furnace and electrode melt.
Figure 3:
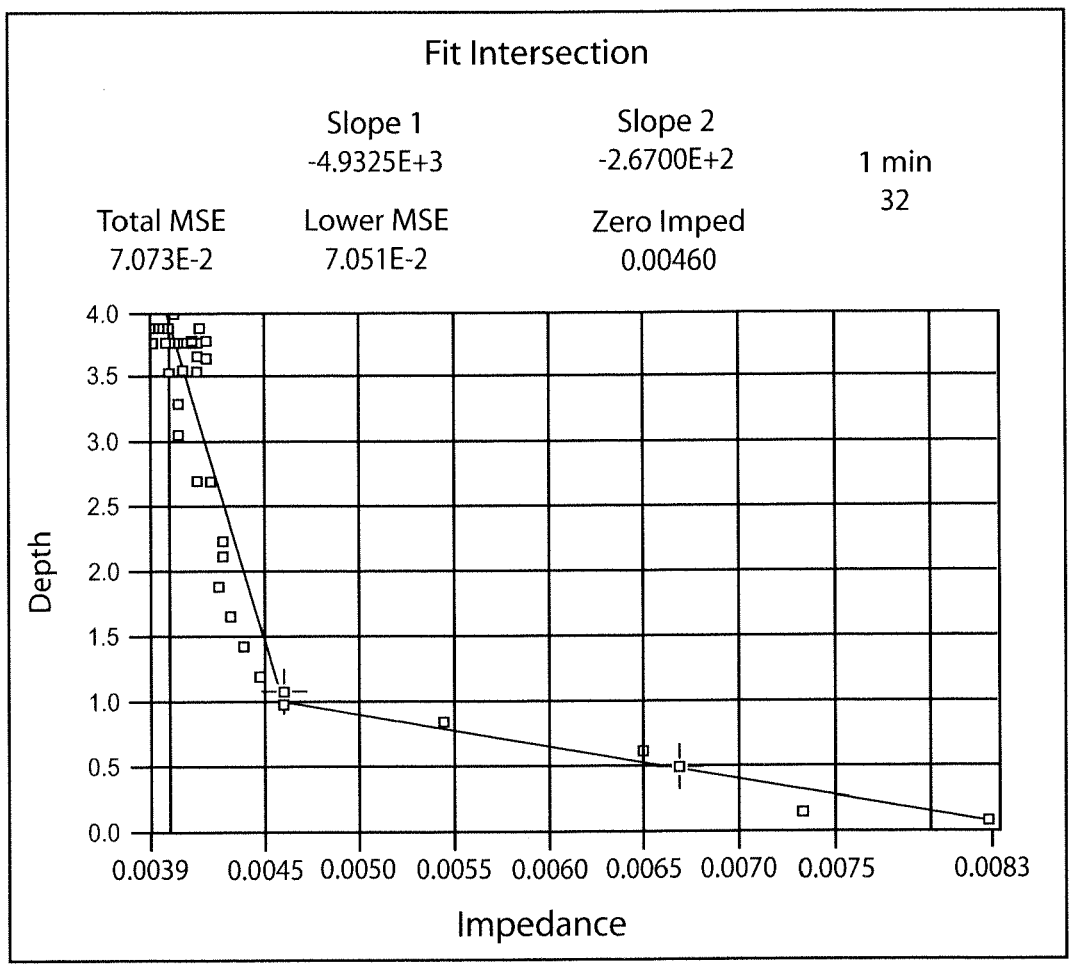
FIG. 3 illustrates output from a bilinear regression program used according to the invention to determine an electrode depth/impedance relationship.

It is well known that the impedance in an ESR furnace increases as immersion depth decreases. At a simplified level for relatively deep immersion depths, the slag can be viewed as a resistor, so the voltage is given by Ohm's Law:

$V=I[d/(Ak)]$, where V is the voltage, I is the current, and the resistance of the slag is approximated by the expression in the brackets where d is the distance between the electrode and the molten metal pool, A is the area of the electrode in contact with the slag, and k is the slag conductivity. However, as the tip of the electrode rises in the slag, the simplified expression above does not hold. In repeated tests where the electrode was withdrawn from the slag, a dramatic change in the slope of the impedance occurred as shown in FIG. 2 at an approximate impedance of 15 mohm. Since contact impedance must become a factor in the total impedance at some point during the withdrawal of the electrode from the slag, and the contact impedance is much larger than the impedance of the molten slag, the point where the slope of the impedance changes is the point where portions of the irregular electrode tip first lose contact with the slag. This point is defined as the surface impedance, which corresponds to zero immersion depth.

Although the surface impedance in FIG. 2 is approximately 15 mohm, the surface impedance for other furnaces, melting conditions or times is likely to be different. The key to determining the immersion depth is to know the surface impedance and the relationship between impedance and depth, above and below that point for each melt. Given a set of n measurement points of impedance and immersion depth above and below the surface impedance, numerous mathematical criteria and methods can be applied to the impedance data to identify that information. One effective embodiment is to use a bilinear regression with the constraint that the intersection occurs between two successive data points. The details for such a regression can be readily determined from standard regression methods.

Using this approach with n points, ordered in decreasing impedance numbered 1 to n, the procedure would start with a few points in one set and the remainder in the second set. The regression would be performed and the mean squared error between the regression impedance and measured impedance would be calculated. Then the next point would be moved from the second set to the first and the regression and error calculation repeated. These steps would be repeated for the successive points moving them from the second to the first set until just a few points remained in the -second set. Either of the successive points between the data sets where the minimum error is calculated provides a good estimate of the surface impedance. The slopes of the lines give the depth-impedance relationships. Further steps could be taken to determine the impedance between the dividing points where the lines intersect, but the noise in the process generally makes that calculation unnecessary. Variations using weighted regression and regression employing error characterization could also be effective. The data points for the regression can be obtained by deliberately moving the electrode or though the monitoring of the process.

While impedance is the preferred metric for identifying the surface, the slopes of other related electrical signals derived from impedance, voltage and/or current could be used to determine the surface. Also time, position or other related metrics could be used instead of depth in the regression to determine the surface impedance. Other mathematical fitting or regression methods could be utilized to determine or estimate the point of the slope change in linear models or other corresponding metrics of slope changes in higher order models, and the depth-impedance relationship around that point. The methods could include higher order fits or exponential relationships considering for example the points where the curvature exceeds a given value or the point of maximum slope change.

While these steps identify the surface impedance at that particular time, the variation in the melting process due to lack of uniformity in the electrode or process disturbances causes changes in the power applied to the ESR process. The power fluctuations change the temperature of the molten slag cap. Several relationships have been developed to approximate the impedance-temperature relationship and could be used. One such approximation employs an Arrhenius relationship with temperature. This invention adjusts the surface impedance using the relationship:

$$\tilde{r}_s = r_s \exp(-A_{elect}(T_S - T^*_S)),$$

where $\tilde{r}_s$ indicates the temperature adjusted surface impedance based on the slag resistivity temperature coefficient, $A_{elect}$ and the slag temperature difference between the estimated slag temperature $T_s$ and the nominal temperature $T^*_S$. Since a measurement of the slag temperature is generally impractical, an estimated slag temperature can be calculated. One option would be to use a thermal model of the process combining the input power and the losses due to conduction and radiation.

This invention also embodies a method and apparatus for periodically collecting the appropriate data sets, determining if the data set is appropriate, and if so recalculating the surface impedance, since the surface impedance is not constant. It will vary with slag composition, furnace properties and melting conditions. The preferred approach is as follows:

1. Monitor the impedance while the drive is stopped and the electrode melts out of the slag or is driven up out of the slag to a point above the surface impedance.
2. Save the impedance and position data as the electrode is rapidly driven back into the slag below the surface impedance.
3. Convert the position (P) to depth change ($D_C$) by:

$$D_C = (P_0 - P)^*(1 + D_F)$$

$$D_F = A_e/(A_m - A_e)$$

where $P_0$ is the starting position and $A_m$ and $A_e$ are the transverse areas of the mold and electrode respectively,
4. Order the data by increasing impedance along with the corresponding depth change.
5. Divide the data into two parts starting with the first three points in one part and the remaining points in the other.
6. Compute a bilinear least squares fit and save the sum of squared errors (SSE) between the fit and the data.
7. Move the next point in the second part of the data set to the first part.
8. Repeat steps 5 and 6 until only three points remain in the second part.
9. If the minimum SSE is below an appropriate threshold, the surface impedance or zero depth is identified as the end data point of the first part where the minimum SSE was found. The slopes of the two lines provide the estimate of the depth-impedance relationship above and below the surface.

There are other means for collecting the data set than the procedure outlined in step 1. Other related electrical signals besides impedance could be monitored such as voltage to determine if the electrode tip is above the surface impedance. If the depth is appropriate, acceptable data sets could be found by monitoring the melting process, instead of inducing changing in the normal operation to produce the data.

Higher order fits including exponential forms can be employed to identify the surface impedance and the relationship above and below the surface. The surface impedance would best be determined by combining the results from several data sets in an appropriate fashion (e.g., averaging) since the ESR process and the data collection are inherently noisy.

After determining the surface impedance and the impedance-depth relationship above and below the surface, immersion depth control can be accomplished by driving in response to the difference between the determined immersion depth from the measured impedance and the immersion depth set point. A variety of different drive responses could be used to move the electrode to the correct immersion depth. An effective approach is to set the drive velocity, V as defined by:

$$V = K^*(D_d - D_s) + V_n,$$

where K is the proportionality constant which includes the controller time constants and electrode and ingot area ratio, $D_d$ is the determined depth and $D_s$ is the desired immersion depth set point and $V_n$ is the nominal velocity for the given melting rate.

Although the invention has been described in detail with particular reference to these preferred embodiments, other embodiments can achieve similar results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of controlling an electroslag remelting furnace, the method comprising the steps of:
    adjusting electrode drive speed by an amount proportional to the difference between a metric of electrode immersion depth calculated from at least impedance and temperature signals and a set point;
    monitoring furnace signals comprising at least impedance and temperature signals;
    identifying a corresponding magnitude of the impedance signal when the electrode tip is at a zero depth of immersion; and
    calculating the metric of electrode immersion depth based upon a predetermined characterization of electrode immersion depth as a function of the furnace signals, comprising adjusting the impedance signal based upon the temperature signal.

2. The method of claim 1 wherein in the calculating step the function is a compound linear function.

3. The method of claim 2 wherein in the calculating step a point of intersection of two lines of the compound function corresponds to impedance at zero immersion depth.

4. The method of claim 3 wherein in the calculating step the function was predetermined based upon a bilinear regression of collected experimental data points as to corresponding impedance and electrode immersion depth.

5. The method of claim 4 wherein in the calculating step the point of intersection minimized a sum of squared errors in the bilinear regression.

6. The method of claim 1 wherein the adjusting based on temperature step adjusts according to an Arrhenius relationship.

7. The method of claim 1 wherein the furnace signal comprises a voltage signal.

8. The method of claim 6 wherein the furnace signal comprises a current signal.

9. An apparatus for controlling an electroslag remelting furnace, said apparatus comprising:

means for adjusting electrode drive speed by a predetermined amount if a metric of electrode immersion depth calculated from at least impedance and temperature signals differs from a set point by a predetermined maximum amount;

means for monitoring furnace signals comprising at least impedance and temperature signals; and means for calculating the metric of electrode immersion depth based upon a predetermined characterization of electrode immersion depth as a function of the furnace signals, comprising adjusting said impedance signal based upon said temperature signal.

10. The apparatus of claim 9 wherein in said calculating means said function is a compound linear function.

11. The apparatus of claim 10 wherein in said calculating means a point of intersection of two lines of said compound function corresponds to impedance at zero immersion depth.

12. The apparatus of claim 11 wherein in said calculating means said function is predetermined based upon a bilinear regression of collected experimental data points as to corresponding furnace signal and electrode immersion depth.

13. The apparatus of claim 12 wherein in said calculating means said point of intersection minimizes a sum of squared errors in said bilinear regression.

14. The apparatus of claim 9 wherein said means for adjusting based upon temperature adjusts according to an Arrhenius relationship.

15. The apparatus of claim 9 wherein said furnace signal comprises at least a voltage signal.

16. The apparatus of claim 9 wherein said furnace signal comprises a current signal.

* * * * *